UNITED STATES PATENT OFFICE.

CORNELIUS ERIK CORNELIUS, OF STOCKHOLM, SWEDEN.

PRODUCTION OF ZINC.

1,398,006.　　　Specification of Letters Patent.　　Patented Nov. 22, 1921.

No Drawing.　　Application filed March 17, 1921. Serial No. 453,008.

*To all whom it may concern:*

Be it known that I, CORNELIUS ERIK CORNELIUS, a subject of the King of Sweden, and resident of 22 Narvavägen, Stockholm, in the Kingdom of Sweden, engineer, have invented certain new and useful Improvements in the Production of Zinc, of which the following is a specification.

A drawback in the production of zinc by the reduction of zinc ore has hitherto been the formation of a certain amount of zinc oxid, which adheres to the walls of the dust chambers and condensers, which finally get clogged thereby, so that the running of the plant has to be interrupted for the purpose of cleaning. The generation of the zinc oxid is due to the fact among others that the zinc extracted by reduction is oxidized by the oxygen in the water which occurs in the zinc ore, or both in the ore and in the materials added to the charge. Referring to my application No. 487,990 filed July 27, 1921, wherein is described a process of zinc production characterized by the fact that the zinc vapor coming from the furnace is cooled down to a temperature that will cause the zinc vapor to go over from the vapor state to the powder state without forming any liquid zinc and by the fact that this powder is transferred to another furnace in order to get out the free metallic powdered zinc as liquid zinc it is desirable to get the largest proportion of free metallic zinc into zinc powder the charge before entering the reduction furnace should therefore be as free as possible for any substance which would cause an oxidation of the generated zinc vapors.

The object of the present invention is, in the production of zinc by reduction of zinc ore, particularly by a continuous process, such as set forth in the before mentioned application 487,990, to prevent the above-mentioned drawbacks by the removal of water and gases in the zinc or in the ore and in the materials added to the charge, namely by heating the zinc ore, or the ore and the added materials, electrically, previous to the reduction. When both the zinc ore and the materials added to the charge are to be heated for the purpose in question, they may be heated either simultaneously or separately. This heating, which obviously should not be carried so far that the zinc begins to be extracted by reduction, which is a subsequent process, may suitably be effected in an electrically heated furnace, either rotary or movable in some other way, so that the material in it is agitated.

By the heating of the material (the zinc ore, or both the ore and the materials added to the charge) electrically the complete removal of the water and gases is effected in a simple, convenient and cheap way.

Having now described my invention, what I claim as new and desire to secure by Letters Patent is:

A process in the electro-thermic production of zinc during the treatment of the zinc ore in dust chambers or condensers, consisting in preliminarily and before the extraction step begins, of heating the ore sufficiently to drive off the water ordinarily existing in the ore or the material added thereto, but not extending the heating step to the point where the zinc extraction begins, whereby clogging of the chamber or condenser walls is prevented and the hydrogen from the water which would tend to dilute the zinc vapors is practically all eradicated as described.

In witness whereof I have hereunto set my hand in presence of two witnesses.

CORNELIUS ERIK CORNELIUS.

Witnesses:
　H. B. OHLSEN,
　HERBERT BENSON.